United States Patent [19]

Cloeren et al.

[11] Patent Number: 4,784,815
[45] Date of Patent: Nov. 15, 1988

[54] EDGE-LAMINATING APPARATUS AND PROCESS

[75] Inventors: Peter F. Cloeren; Charles H. Wernery, Jr., both of Orange, Tex.

[73] Assignee: P.C.E. Corp., Orange, Tex.

[21] Appl. No.: 59,101

[22] Filed: Jun. 5, 1987

[51] Int. Cl.⁴ .................................... B29C 47/70
[52] U.S. Cl. ................................ 264/171; 264/40.7; 264/245; 425/131.1; 425/133.5; 425/146; 425/192 R; 425/381; 425/462; 425/466
[58] Field of Search ............... 264/171, 173, 40.7, 264/245, 252; 425/131.1, 133.5, 462, 146, 467, 192 R, 466, 381

[56] References Cited

U.S. PATENT DOCUMENTS

| | | |
|---|---|---|
| 3,097,058 | 7/1963 | Branslum et al. .................... 264/245 |
| 3,397,428 | 8/1968 | Donald . |
| 3,448,183 | 6/1969 | Chisholm ......................... 425/133.5 |
| 3,479,425 | 11/1969 | Lefevre et al. . |
| 3,504,402 | 4/1970 | Wetz et al. ....................... 425/131.1 |
| 3,583,032 | 6/1971 | Stafford .......................... 425/192 R |
| 3,860,372 | 1/1975 | Newman, Jr. . |
| 3,909,170 | 9/1975 | Riboulet et al. .................. 425/133.5 |
| 3,924,990 | 12/1975 | Schrenk ............................. 425/462 |
| 4,197,069 | 4/1980 | Cloeren . |
| 4,289,560 | 9/1981 | Simons ............................ 425/131.1 |
| 4,483,812 | 11/1984 | Hahn et al. ...................... 425/131.1 |
| 4,521,359 | 6/1985 | Tsien ................................ 264/171 |
| 4,533,510 | 8/1985 | Nissel . |
| 4,562,023 | 12/1985 | Pabst et al. ........................ 264/245 |

FOREIGN PATENT DOCUMENTS

| | | |
|---|---|---|
| 2629333 | 1/1978 | Fed. Rep. of Germany ... 425/131.1 |
| 2851930 | 6/1980 | Fed. Rep. of Germany ...... 425/462 |
| 55-28825 | 2/1980 | Japan . |
| 56-00125 | 1/1981 | Japan ................................ 425/146 |
| 61-89823 | 5/1986 | Japan ............................ 425/131.1 |

OTHER PUBLICATIONS

Polyside ® Side by Side Co-Extruded Structures Advertisement, Extrusion Dies, Inc.

Primary Examiner—Jeffery Thurlow
Attorney, Agent, or Firm—Timothy R. Kroboth

[57] ABSTRACT

The present invention provides a novel edge-laminating apparatus, in which an edge-laminating stream exiting from an edge-laminating flow channel, is driven by flow pressure into an edge of another stream. Also provided is a novel process for forming an edge-laminated stream, and for forming an extruded product.

29 Claims, 6 Drawing Sheets fig. 7.

ered patent No. 4,784,815

EDGE-LAMINATING APPARATUS AND PROCESS

TECHNICAL FIELD

This invention relates to the extrusion art, more particularly, to edge-lamination, especially of thermoplastic compositions such as synthetic resins.

BACKGROUND ART

As illustrated by U.S. Pat. Nos. 3,397,428 to Donald, 3,479,425 to Lefevre et al, and 3,860,372 to Newman, Jr., encapsulation of a core stream is known. As exemplified by Japanese Patent Document No. 55/28825, also known is a multimanifold die in which the center manifold may be partially dammed, to produce a sandwiched core layer, as shown in FIG. 7 thereof.

In the coextrusion art, as exemplified by U.S. Pat. No. 4,197,069 to Cloeren, a melt-laminate may be formed that has a core stream between adjacent streams. In certain cases, it is desirable to isolate the edges of the core stream from flow passageway walls. A deficiency with using encapsulation or sandwiching to provide the isolation, is that the resulting product would include an upper and lower layer of the same composition as the encapsulating or sandwiching material.

Furthermore, it is sometimes necessary as a result of a drawdown effect, to remove edges of an extruded product. When the product includes a special material such as a thermally unstable, corrosive or expensive material, it would be beneficial to isolate the special material from the edges, so that the special material would not be removed during a later trimming step.

A drawback with using an encapsulation or sandwiching process to isolate the special material from the edges, is that, after trimming, the resultant product would include an upper and lower layer of the same composition as the encapsulating or sandwiching material. Accordingly, such an approach lacks flexibility in the selection of an edge material.

Moreover, an extruded product including a core that may be one or more layers, and including a narrow or wide edge layer on one or both sides of the core, is desirable. A problem with using encapsulation or sandwiching to produce this product, is that an upper layer and a lower layer of the same composition as the encapsulating or sandwiching material, would be added to the core, and an edge layer would be added on both sides of the core.

Also known, as illustrated by U.S. Pat. No. 4,533,510 to Nissel, is an edge-laminating apparatus that relies upon an adjustable flow-dividing block in a die manifold. Flow volume per segment into an edge layer channel should be closely matched to the appropriate flow volume per segment in a core channel. Therefore, changing the width of an edge-laminating layer, disadvantageously requires a flow volume adjustment and a mechanical adjustment. Otherwise, flow instability may result, producing a wavy edge-lamination seam. The edge layer channel is parallel to the core channel.

Therefore, there remains a need for an improved edge-laminating apparatus that could isolate the edges of a core stream from flow passageway walls, and that could even isolate a special material such as a thermally unstable, corrosive or expensive material, from the product edges so that the special material would not be removed during a post-extrusion trimming step.

An improved edge-laminating apparatus would provide an even greater contribution to the art, if it could produce an extruded product of varied edge layer width, on one or both sides of a core. Such an apparatus would be especially valuable to the art if it included an easily removable, edge-lamination assembly. The apparatus would be especially useful if it could be included in a feedblock. Such an edge-laminating apparatus would make possible an improved edge-lamination process.

DISCLOSURE OF THE INVENTION

It is accordingly an object of the present invention to provide an improved edge-laminating apparatus that can isolate the edges of a core stream from flow passageway walls, and that can even isolate a special material such as a thermally unstable, corrosive or expensive material, from the product edges so that the special material would not be removed during a post-extrusion trimming step.

It is a further object of the present invention to provide an improved edge-laminating apparatus that can produce an extruded product of varied edge layer width, on one or both sides of a core.

It is an even further object to provide an edge-laminating apparatus that includes an edge-lamination assembly that is removable without apparatus disassembly.

It is a still further object to provide an edge-laminating apparatus that can be included in a feedblock.

It is an additional object to provide an improved edge-lamination process.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided a unique edge-laminating apparatus. The apparatus includes a flow passage and an edge-laminating flow channel that converge. The edge-laminating flow channel is oriented at the convergence, relative to the flow passage, such that an edge-laminating stream exiting from the edge-laminating flow channel, is driven by flow pressure into an edge of a stream flowing through the flow passage.

Also provided is a process for forming an edge-laminated stream. In the process, a first stream and an edge-laminating stream are converged, with the edge-laminating stream being driven by flow pressure into an edge of the first stream. As a result, the edge of the first stream is laterally displaced and the width of the first stream is reduced.

Additionally, there is provided an alternative process for forming an edge-laminated stream. In the process, an edge-laminating stream is driven by flow pressure into an edge of another stream, after the stream edge has been laterally displaced and the stream width has been reduced.

Also provided is a novel process for removing edges of an extruded product. In the process, an edge-laminating stream is driven by flow pressure into an edge of another stream. The edge-laminating stream is chosen so that it is sufficiently incompatible with the other stream that a layer formed by the edge-laminating stream, may be peeled away from a core formed by the other stream. Afterwards, there is extruded a composite stream including an edge layer formed by the edge-laminating stream, and a core formed by the other stream. Then, the edge layer is peeled away from the core.

In the drawing and in the detailed description of the invention that follows, there are shown and essentially described only preferred embodiments of this invention, simply by way of illustration of the best mode contemplated by us of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an edge-laminating apparatus in accordance with the present invention.

BEST MODE FOR CARRYING OUT THE INVENTION

As explained above, the present invention is directed to a novel edge-laminating apparatus and to a unique edge-lamination process. This invention is useful for a core stream and edge-laminating streams of substantially equal or dissimilar viscosities. For ease of understanding, the foregoing drawing and nearly all of the following description, pertain to the use of materials of substantially equal viscosities.

Figures 1, 4:
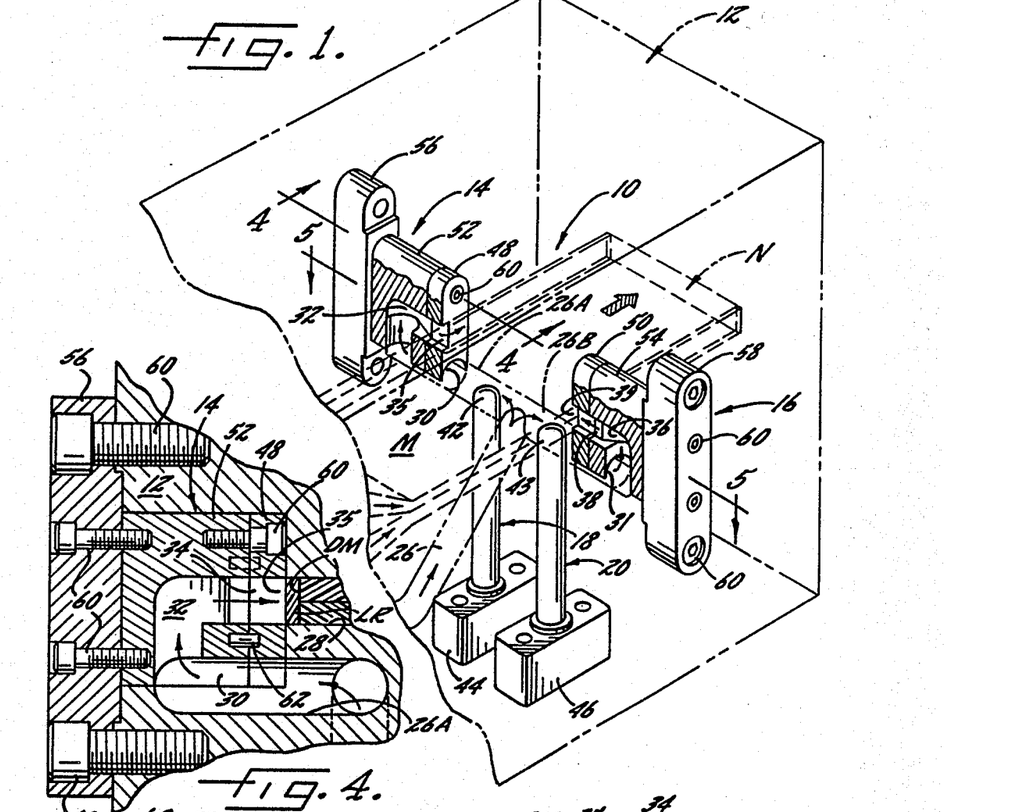
FIG. 1 is a perspective view of a preferred embodiment of an edge-laminating apparatus in accordance with the present invention, showing the apparatus in a feedlock 12, a portion of which is broken away.
FIG. 4 is an enlarged cross-sectional view taken along line 4—4 of FIG. 1, showing in detail the flow pathway of an edge-laminating stream through edge-lamination assembly 14.

Referring to FIG. 1, a preferred edge-laminating apparatus 10 in accordance with the present invention, is shown. The apparatus is depicted in a feedblock 12. It will be understood, as the description of the apparatus proceeds, that the apparatus could be in a separate body, and even used separate from a feedblock.

Disposed within the feedblock are removably mounted edge-lamination assemblies 14,16, the side walls of which are partially broken away to reveal entire flow passageways. As will become clear, the removability of assemblies 14,16 is very advantageous.

Also disposed within feedblock 12 is an edge-laminating flow channel 26. Channel 26 splits to form channels 26A,26B, which connect to edge-lamination assemblies 14,16, respectively.

Assemblies 14,16 form channels 26A,26B in part. Specifically, now with reference also to FIG. 4 and to lamination assembly 14 shown therein, assembly 14 includes a concave lower wall 30, which forms an upper wall of channel 26A. Similarly, referring again to FIG. 1, assembly 16 includes a concave lower wall 31, which forms an upper wall of channel 26B.

Figure 2:
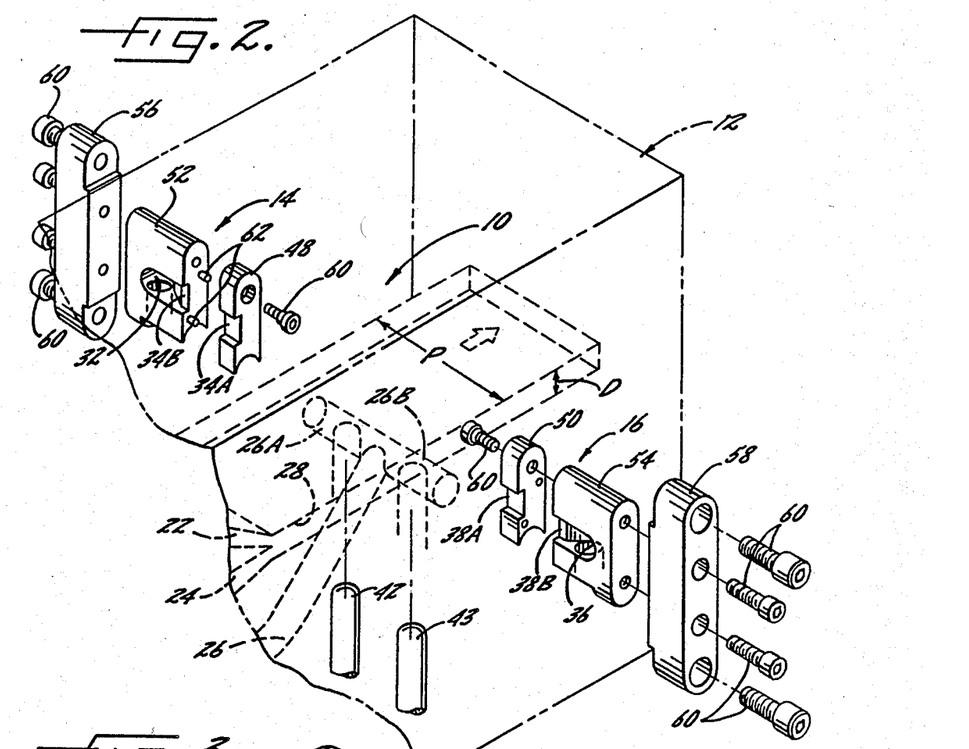
FIG. 2 is an exploded perspective view of the edge-laminating apparatus of FIG. 1.

With reference to FIG. 2, the edge-laminating apparatus also includes a flow passage 28, which is an exit flow passage in feedblock 12. Flow passage 28 is formed in the feedblock by the convergence of flow channels 22,24. Passage 28 has a width-wise dimension P, which is suitably the same for the entire length of the passage. The flow direction of a stream through the passage, is represented by an enlarged arrow.

Figures 3, 6:
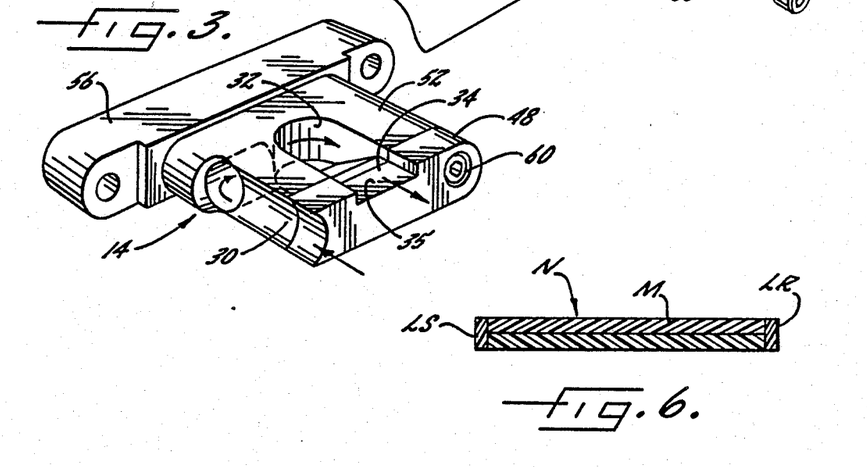
FIG. 3 is an enlarged perspective view of edge-lamination assembly 14 of FIG. 1.
FIG. 6 is a cross-sectional view of the edge-laminated, main stream taken along line 6—6 of FIG. 5.

Referring now to FIGS. 3 and 4, channel 26A connects to a manifold 32 and then to a land channel 34 of edge-lamination assembly 14. Land channel 34 terminates in an exit slot 35, best seen from FIGS. 3 and 5 together, which interfaces with flow passage 28. The exit slot is suitably formed by a wall 37, shown in FIG. 5, of the feedblock and by the walls of land channel 34. Convergence of an edge-laminating stream and a stream in flow passage 28 takes place at the interface of the exit slot with flow passage 28.

In the manifold, an edge-laminating stream is transversely spread to a width equal to a height D, shown in FIG. 2, of flow passage 28. The land channel should have a length and a gap sufficient to restrict flow such that an adequate back pressure is produced in the manifold to provide uniform widthwise distribution of the edge-laminating stream as the stream enters the land channel.

The width of the edge-laminating stream is maintained in the land channel and as the stream passes through the exit slot. FIG. 4 shows the result: an edge-laminated stream having a core stream and an edge-laminating stream of the same thickness. Thus, the land channel and exit slot should have a width equal to height D of passage 28.

The land channel and exit slot should have a gap that matches the flow velocity of the edge-laminating stream at convergence, to that of the stream in flow passage 28, thereby promoting laminar flow at convergence. Assuming a constant volume output from the land channel, a relatively larger gap permits a relative decreased velocity of the edge-laminating stream, whereas a relatively smaller gap produces a relatively increased velocity of the edge-laminating stream.

The length of the land channel should also ensure that a uniform velocity profile of the edge-laminating stream is established prior to convergence with the stream in passage 28.

For sake of example, for a flow passage having a width P of 4" and a height D of ⅜", the land channel could be approximately 1" in length; the land channel and exit slot would have a width matching that of the flow passage, that is, ⅜"; and the land channel and exit slot could have a gap of approximately 0.20 inches. A land channel and exit slot with other dimensions can be easily provided by removal of assembly 14 and replacement with an assembly having the desired dimensions.

Figure 5:
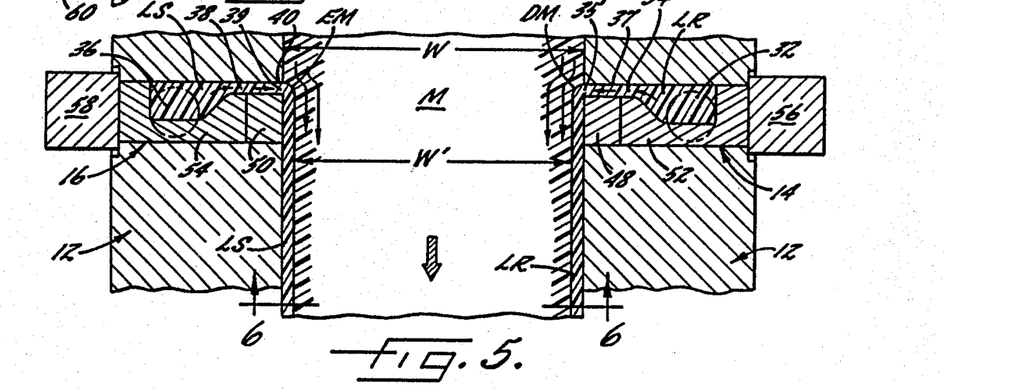
FIG. 5 is an enlarged cross-sectional view taken along line 5—5 of FIG. 1, depicting lateral displacement of the edges of a main stream M by the edge-laminating streams, and the formation of an edge-laminated, main stream.

Referring now to FIG. 5, land channel 34 and exit slot 35 are suitably oriented generally perpendicular to the flow-direction of flow passage 28, so that an edge-laminating stream LR exiting from the slot, converges with stream M in flow passage 28 at an angle generally perpendicular to the flow-direction of stream M. If desired, the exit slot could be oriented at a lesser angle, say an angle of about 75° or even about 45°.

The convergence angle is chosen based upon considerations including the desired removability of an edge-lamination assembly, the ease of manufacturing a particular removable edge-lamination assembly, the promotion of laminar flow of the converged streams, the relative viscosities of a core stream and an edge-lamitating stream, and the thermal sensitivity of an edge-laminating stream. It will be appreciated that an angle that best suits one of these considerations may oppose another of these considerations. Primarily based upon the first two considerations, we prefer a generally perpendicular orientation.

In any event, the convergence angle selected must permit an edge-laminating stream to be driven by flow pressure into an edge of the core stream so as to laterally displace the edge. As a result, as diagrammatically shown, the width of the core stream is reduced from W to W'. Therefore, the land channel and exit slot may not be oriented generally parallel to the flow-direction of passage 28.

Similarly, with reference to FIGS. 1 and 5, channel 26B connects to a manifold 36 and then to a land channel 38 of lamination assembly 16. Land channel 38 terminates in an exit slot 39, which interfaces with flow passage 28, shown in FIG. 2. Exit slot 39 is formed by a wall 40 of the feedblock and by the walls of land channel 38.

As shown in FIG. 5, exit slot 39 is also suitably oriented generally perpendicular to the flow-direction of passage 28. Thus, an edge-laminating stream LS converges with stream M at an angle generally perpendicular to the flow-direction of stream M.

With reference again to FIG. 1, the edge-laminating apparatus further includes valves 18,20. These valves include valve stems 42,43 and valve bodies 44,46, as shown. Valves 18,20 control flow through channels 26A,26B, respectively, and accordingly through the edge-lamination assemblies.

These valves enable flow to be in balance. Due to, for instance, imperfect symmetry of the edge-laminating apparatus or a temperature difference across the body in which the apparatus is disposed, flow from one edge-lamination assembly could be at a greater volume than from the other assembly. If, for instance, the flow volume through assembly 16 were greater than that through assembly 14, valve 18 may be further opened to increase the flow volume through assembly 14, or valve 20 could be further closed.

The width of an edge-laminating layer is flow volume dependent. Thus, a relatively greater flow volume through one edge-lamination assembly than through the other, will produce a relatively greater edge-laminating layer width on one side of the core than on the other. Typically, it will be desired for these widths to be the same, and thus for side-to-side flow volume to be in balance.

The total flow volume through the edge-laminating flow channel is determined by the extruder output to that flow channel, and is chosen to produce a desired width for the edge-laminating layers. Accordingly, if, for example, it were desired to produce a 40" wide sheet with an edge-laminating layer width of 1" on each side, then the extruder output to the edge-laminating flow channel would be chosen to provide a flow volume through each edge-lamination assembly that equals 2.5% of the total flow through flow passage 28 after convergence. Hence, generally speaking, the extruder output to the edge-laminating channel will be set, and then the valves adjusted to give a balanced flow through assemblies 14,16.

It will be understood that the foregoing example assumes equal viscosities of the core stream and edge-laminating streams. Thus, if, for instance, the edge-laminating stream were of lower viscosity than the core stream, the width of the edge-laminating layer could be less than 1" on each side.

Furthermore, assuming with regard to the foregoing example, that flow passage 28 of feedblock 12 has a width P of 4" and that therefore there is a 10:1 spread ratio as the edge-laminated composite exits the feedblock and is spread in a downstream die manifold to form the 40" wide sheet, it would be necessary to provide only a 0.1" wide edge-laminating layer within the feedblock. In contrast, to produce a 40" wide sheet with a 1" wide edge-laminating layer in U.S. Pat. No. 4,533,510, it would be necessary to provide a 1" flow of the edge-laminating stream directly into the die manifold. Accordingly, the '510 apparatus is more sensitive to flow instability induced by volumetric flow changes, than the present invention using a feedblock.

Also, it should be understood that in the present invention, the relative volumetric flow through an edge-laminating flow channel and through a core flow passage may be mismatched about 10% or more, even up to in some cases about 35–50% or more, without flow instability at convergence.

Referring again to FIG. 2, edge-lamination assemblies 14,16 include endpieces 48,50, manifold bodies 52,54, and flanges 56,58, as component parts. Land channel portions 34A,34B of endpiece 48 and manifold body 52, respectively, form the land channel of assembly 14. Similarly, land channel portions 38A,38B of endpiece 50 and manifold body 54, respectively, form the land channel of assembly 16. Capscrews 60 and pins 62 fasten and hold the components of the assemblies together, and capscrews 60 removably mount assemblies 14,16 to feedblock 12 through mounting flanges 56,58. Assemblies 14,16 are therefore removable without feedblock disassembly.

As will become clear from a later discussion of other embodiments of the edge-lamination assemblies, it is advantageous to provide the endpieces as components separable from the manifold bodies. However, an endpiece and a manifold body could be manufactured as one piece.

In operation, with reference to FIG. 1, an edge-laminating stream flows through channel 26 and then splits into two edge-laminating streams, with one stream flowing through channel 26A and edge-laminating assembly 14, and the other stream passing through channel 26B and assembly 16. Valves 18,20 are adjusted, if necessary, to balance the flow volume from side to side. Concurrently, a main stream M, depicted as a composite stream in the feedblock, is passed through flow passage 28. The back pressure on the edge-laminating streams is greater than that on the main stream.

Referring now to FIG. 5, edge-laminating streams LS,LR are forced by flow pressure into main stream edges DM,EM at an angle generally perpendicular to the flow-direction of the main stream. The result is lateral displacement of the main stream edges, as edge-laminating convergence takes place. Thus, natural flow pressure displacement of the main stream edges takes place.

As shown, lateral displacement of the edges is substantially complete as soon as streams LS,LR converge with main stream M. Lateral displacement of the edges reduces the width of main stream M.

FIG. 5 diagrammatically represents the convergence of a plastic core stream and plastic edge-laminating streams of substantially equal viscosity. If, on the other hand, the viscosity of the edge-laminating streams were substantially less than that of the core stream, FIG. 5 would depict compression of the edge-laminating layer width by the core stream as the resultant edge-laminated stream flowed downstream from the place of convergence.

The resultant edge-laminated stream N is shown in FIG. 6 in cross-section. Reference is also now made to FIG. 1, where a plan view of edge-laminated stream N is shown. Referring again to FIGS. 5 and 6, stream N has the same width as that which stream M had prior to lateral displacement of edges DM,EM.

The flow volume and relative viscosity determine the width of an edge-laminating layer. A relatively greater flow volume of an edge-laminating stream results in a relatively greater edge-laminating layer width. If an edge-laminating stream is of lower viscosity than a core stream, the width of the edge-laminating layer may be relatively less than if the converging streams were of substantially equal viscosity. It should be understood that the width of the edge-laminating layer is not affected by the convergence angle.

As can be understood from the foregoing description, the present invention provides an edge-laminating apparatus that can isolate the edges of a core stream from flow passageway walls.

Furthermore, by appropriately adjusting the flow volume, the improved apparatus of the present invention can isolate a special material such as a thermally unstable, corrosive or expensive material, from the product edges. As a result, if a post-extrusion trimming step is necessary to remove product edges, the special material will not be removed.

Moreover, in view of the flexibility provided by the apparatus of the present invention, in the choice of a material for isolating the special material from the edges, one may select as the edge-laminating layer, a material chemically incompatible with the special material. Accordingly, rather than removing an edge by conventional cutting, an edge may be peeled away from the special material.

Chemically incompatible thermoplastics are wel known. For instance, olefinic polymers are typically incompatible with styrenic polymers, and polyethylene is incompatible with polypropylene. If desired, an incompatible edge-laminating layer could include plasticized silicon.

Additionally, the improved edge-laminating apparatus of the present invention can produce an extruded product of varied edge layer width, on one or both sides of a core. For instance, a 48" wide product can be made with a 16" wide edge layer on one or both sides of a core. The core may consist of one or more layers. To provide an edge layer on only one side of a core, either edge-lamination assembly 14 or 16 may be removed and replaced by a suitable plug. This type of product has special desirability as one color may be used in an edge layer, and another color or colors in the core stream.

Another advantage of the invention is that the addition of a color to an edge layer, may be used to assist an operator in making adjustments to the apparatus.

Figure 7:
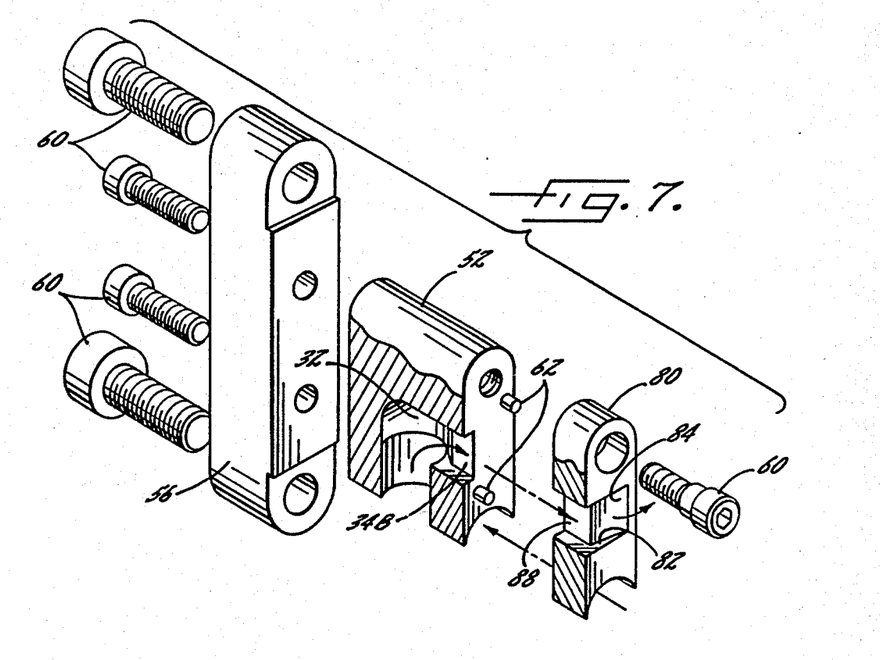
FIG. 7 is an enlarged, exploded perspective view of the edge-lamination assembly of FIG. 3, with endpiece 48 shown in FIG. 3, replaced by an endpiece 80.
Figure 8:
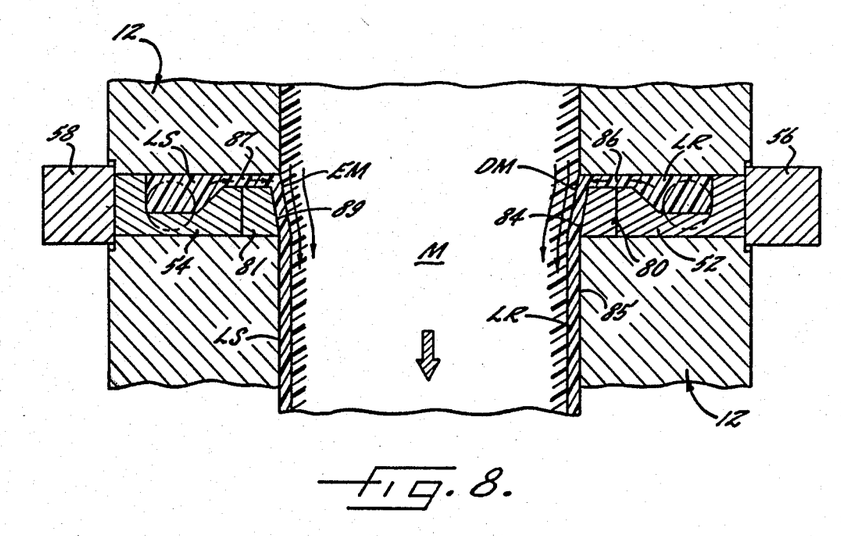
FIG. 8 is a cross-sectional view identical to that of FIG. 5, showing another embodiment of a preferred edge-laminating apparatus in accordance with the present invention, in which the edge-laminating streams produce a gradual lateral displacement of the main stream edges.

FIGS. 7 and 8 together show another embodiment of a preferred edge-laminating apparatus in accordance with the present invention. In this embodiment, endpieces 48,50 of FIG. 5 are replaced by endpieces 80,81. Each of endpieces 80,81 includes a transition channel which narrows in depth in the flow-direction of passage 28. Thus, in this embodiment, the edge-laminating flow channels include transition channels.

FIG. 7 depicts an endpiece 80 with a transition channel 82. Channel 82 includes a displacement-effecting wall 84.

As shown in FIG. 8, transition channel 82 narrows in depth until wall 84 meets a wall 85 of flow passage 28. An angle of about 5°–10° or about 20° for wall 84, relative to wall 85, is suitable, with a 5° angle typically being preferred relative to a 20° angle.

Also shown are land channels 86,87 of the edge-lamination assemblies of this embodiment, and a displacement-effecting wall 89. Land channels 86,87 are suitably oriented generally perpendicular to the flow-direction of the main flow passage. However, as in the case of the FIG. 1 embodiment, a lesser angle may be used.

As can be seen by comparison of FIGS. 5 and 8, land channel 86 is shorter than corresponding land channel 34. More specifically, land channel portion 88 of endpiece 80 is made shorter than corresponding land channel portion 34A of endpiece 48, to provide for transition channel 82.

In operation, as shown in FIG. 8, which diagrammatically depicts the convergence of streams of substantially equal viscosity, edge-laminating streams LR,LS are forced by flow pressure into the edges of stream M at an angle generally perpendicular to the edges. Pressure from stream M retains streams LR,LS in the transition channels. Displacement walls 84,89 force streams LR,LS into the main channel through gradual lateral displacement of the edges of stream M, as each edge-laminating stream flows through its transition channel.

In this embodiment, the flow pressure of the edge-laminating streams advantageously produces convergence followed by gradual lateral displacement of the core stream edges. Beneficially, gradual lateral displacement may promote laminar flow of the converged streams.

The resultant edge-laminated stream has the same cross-section as that shown in FIG. 6.

Figure 9:
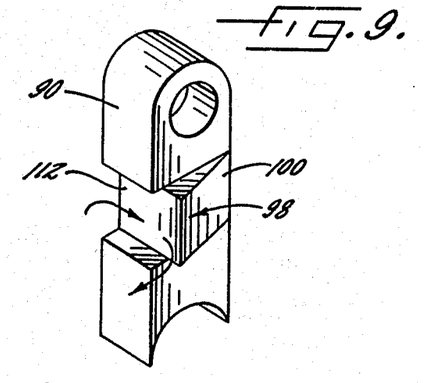
FIG. 9 is an enlarged, perspective view of a further embodiment of an edge-lamination assembly endpiece.
Figure 10:
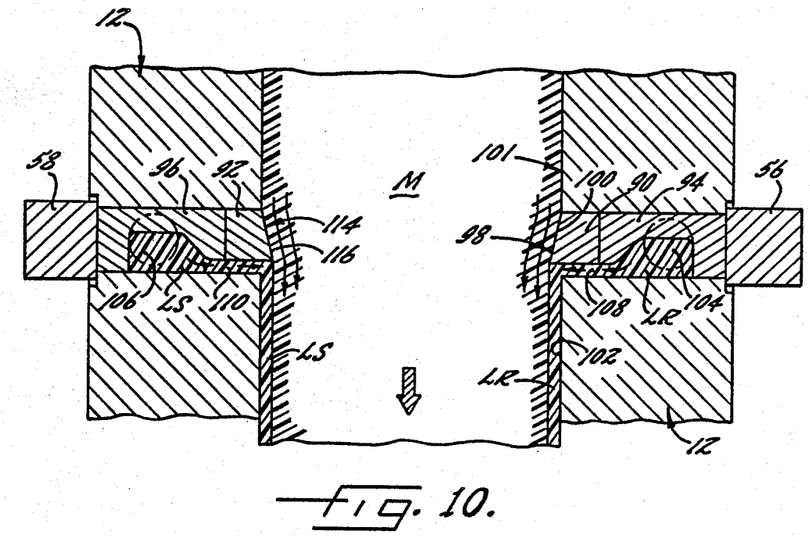
FIG. 10 is a cross-sectional view identical to that of FIG. 5, showing another embodiment of a preferred edge-laminating apparatus in accordance with the present invention, in which mechanical lateral displacement of the main stream edges prior to edge-laminating convergence, is depicted.

FIGS. 9 and 10 together show another embodiment of a preferred edge-laminating apparatus in accordance with the present invention. In this embodiment, endpieces 48,50 and manifold bodies 52,54 of FIG. 5 are replaced by endpieces 90,92 and manifold bodies 94,96. Each of endpieces 90,92 includes a projection having a displacement-effecting wall.

FIG. 9 depicts an endpiece 90 with a projection 98, which includes a displacement-effecting wall 100. As shown, wall 101 of the flow passage is formed by wall 100 of endpiece 90 and a wall 102 of the feedblock. Suitably, as also shown, wall 100 is oriented with respect to said flow passage, to increasingly laterally displace a stream edge. An angle of about 5°–10° or about 20° for wall 100, relative to wall 102 is useful, with a 5° angle generally being more preferred than a 20° angle.

In the case of endpiece 90, projection 98 is that portion of the endpiece that extends inwardly, with respect to flow passage 28, beyond wall 102.

Also shown are manifolds 104,106 and land channels 108,110 of the edge-lamination assemblies of this embodiment, a projection 114 of endpiece 92, and a displacement-effecting wall 116 of projection 114. Land channels 108,110 are suitably oriented generally perpendicular to the flow-direction of the main flow passage.

As can be seen by comparison of FIGS. 5 and 10, land channel 108 is longer than corresponding land channel 34. Specifically, land channel portion 112 of endpiece 90 is made longer than corresponding land channel portion 34A of endpiece 48, to provide displacement-effecting wall 100.

In this embodiment, the edge-laminating flow channels are shown converging with flow passage 28 in a generally perpendicular orientation. However, as in the case of the FIG. 1 embodiment, a lesser angle may be used.

In operation, as shown in FIG. 10, which diagrammatically illustrates the convergence of streams of substantially equal viscosity, displacement-effecting walls 100,116 mechanically produce gradual lateral displacement of stream M, prior to edge-laminating convergence of the core stream and edge-laminating streams LR,LS. An increasing lateral displacement of each edge of stream M, occurs as the core stream flows along the displacement-effecting wall of each removable lamination assembly.

In this embodiment, the core stream is mechanically displaced priop to convergence. Pre-convergent displacement of the core stream is especially advantageous for edge-laminating streams of lower viscosity than the core stream.

By displacing the core stream edges to form a core of reduced width, and establishing laminar flow for a core of reduced width prior to confluence, this embodiment provides for the core stream to remain at the reduced width. In other words, post-convergent compression by the core stream of an edge-laminating layer width, is controlled, as the core stream has lost its displacement tendency. Thus, when an edge-laminating stream of substantially lower viscosity than the core stream is used in this embodiment, there is improved predictability for edge-laminating layer width based upon flow volume and pre-convergent compression of the core stream.

The resultant edge-laminated stream has the same cross-section as that shown in FIG. 6.

When the embodiments of FIGS. 7 and 8, and of FIGS. 9 and 10 are considered, the advantage of the removability of the edge-lamination assemblies is plain. Thus, for instance, one could change from the embodiment of FIG. 1 to that of FIGS. 7 and 8, merely by removing assemblies 14,16 and by substituting the endpieces of the embodiment of FIGS. 7 and 8 for those of FIG. 1. Similarly, one could change to the embodiment of FIGS. 9 and 10 from the embodiment of FIG. 1, simply by removing assemblies 14,16 and replacing the endpieces and manifold bodies of FIG. 1 with those of FIGS. 9 and 10.

Figure 11:
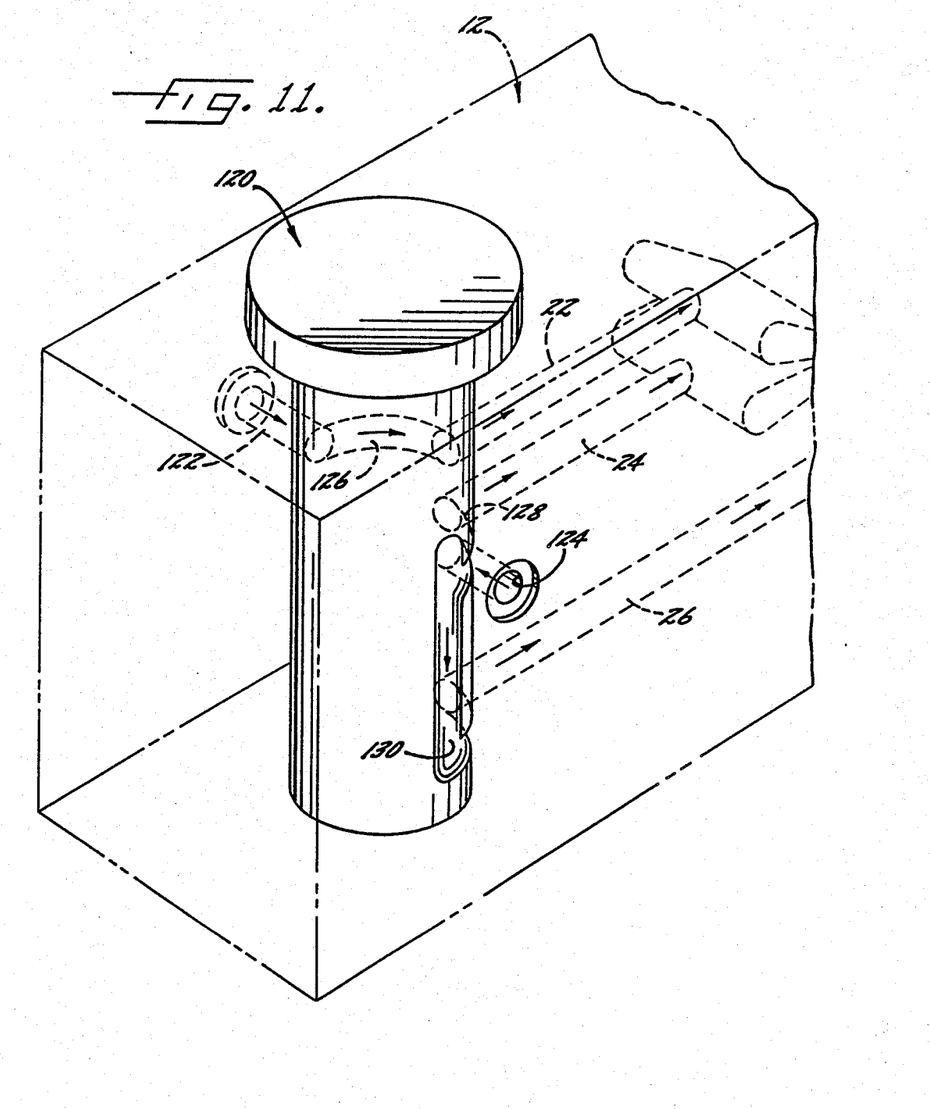
FIG. 11 is a perspective view of the broken-away portion of feedblock 12 of FIG. 1, showing a flow-selecting plug 120 and various flow channels.

Referring now to FIG. 11, the rear portion of, feedblock 12 of FIGS. 1 and 2 is shown, with a flow-selecting plug 120 in place. Depicted in the Figure are flow channels 22,24,26, the continuing portions of which are shown in FIG. 2, and are input channels 122, 124, which connect to flow channels 22,24,26 through plug channels 126,128,130, as shown. The plug channels are formed by recesses in the side of the flow-selecting plug.

In operation, with particular reference to FIGS. 2, 5 and 11, a stream fed into input channel 122 passes through channel 22, and combines with a portion of a stream fed into input channel 124 and passing through channel 24, to form composite stream M in flow passage 28. The other portion of the steam fed into input channel 124, passes through channels 26,26A,26B to edge-laminate the main stream.

Figure 12:
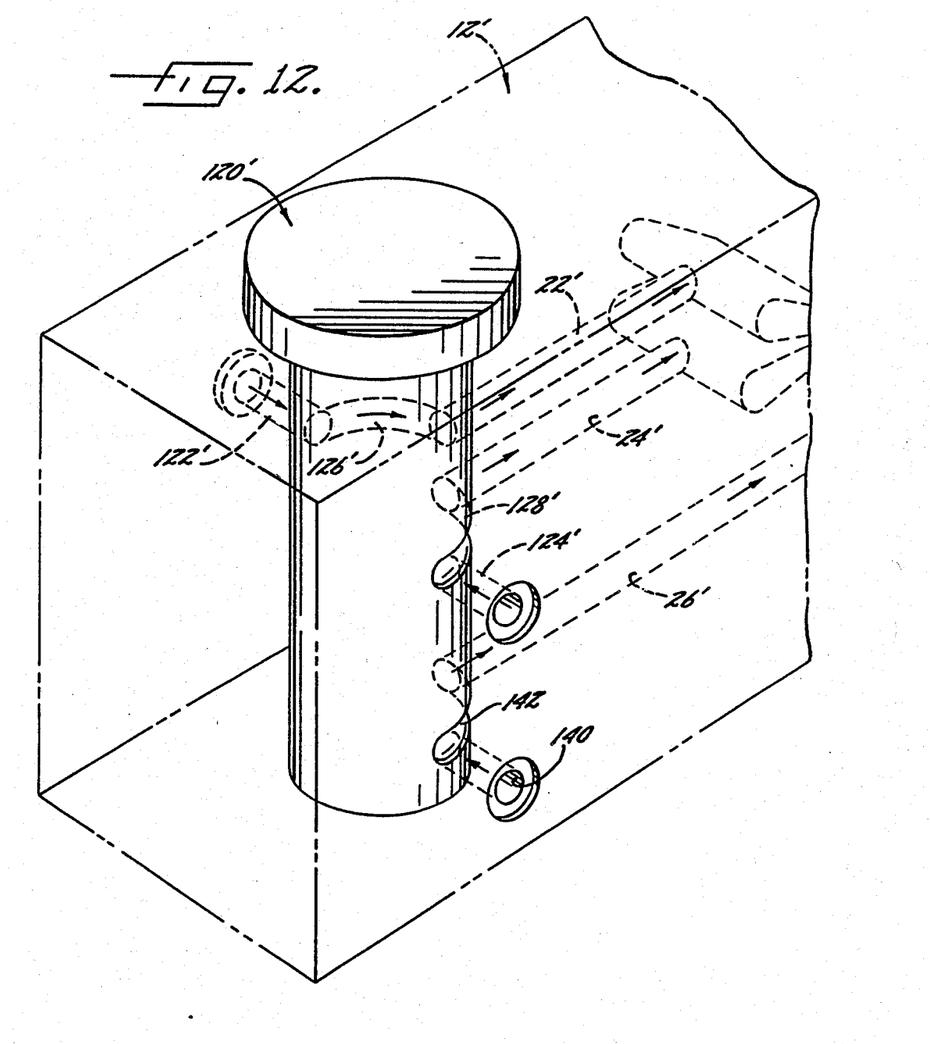
FIG. 12 is a perspective view of an alternative rear portion for feedblock 12 of FIG. 1.

Referring now to FIG. 12, a alternative rear portion of feedblock 12 of FIGS. 1 and 2, designated 12', is shown. In FIG. 12, identical numbers distinguished by an apostrophe, represent parts having a similar function to those of FIG. 11.

Depicted in FIG. 12 are a flow selecting plug 120', flow channels 22',24',26', input channels 122',124', and plug channels 126',128', as shown. Also shown in the Figure are an input channel 140, which connects to edge-laminating channel 26' via a plug channel 142.

In operation, with particular reference to FIGS. 2, 5 and 12, a stream fed into input channel 122' passes through channel 22', and combines with a stream fed into input channel 124' and passing through channel 24', to form main stream M in flow passage 28. An edge-laminating stream is fed into input channel 140 and passes through channels 26',26A,26B to edge-laminate the main stream.

As can be readily seen by comparing FIGS. 11 and 12, substitution of one flow-selecting plug for the other, provides a facile way of selecting a different stream for edge-laminating.

It will be understood that an apparatus in accordance with the present invention, may be used to edge-laminate a stream that consists of either a single layer or of multiple layers.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

Industrial Applicability

This invention is useful for edge-lamination, particularly of molten thermoplastic materials such as synthetic resins.

We claim:

1. An edge-laminating apparatus comprising a first flow passage and an edge-laminating flow channel that converge; wherein said first flow passage comprises means disposed upstream of the convergence, for increasingly laterally displacing an edge of a stream flowing through said first flow passage, and for establishing laminar flow of the width-reduced stream prior to said convergence; wherein said edge-laminating flow channel is defined in part by an edge-lamination assembly, said means disposed upstream being a wall provided by said edge-lamination assembly; and wherein said edge-laminating flow channel is disposed at said convergence, relative to said first flow passage, such that an edge-laminating stream is driven by flow pressure into said edge of said width-reduced stream.

2. The apparatus of claim 1, wherein said edge-lamination assembly is removably mounted.

3. The apparatus of claim 1, wherein said wall is provided by a removably mounted, endpiece element of said edge-lamination assemble.

4. The apparatus of claim 1, further comprising valving means disposed upstream of a manifold of said edge-laminating flow channel.

5. The apparatus of claim 1, wherein said edge-laminating flow channel comprises an inlet channel and a manifold, said inlet channel being upstream of and in fluid communication with said manifold, said inlet channel and said manifold being defined by said edge-lamination assembly.

6. The apparatus of claim 1, wherein said edge-laminating flow channel is oriented at said convergence, generally perpendicular to the flow-direction of said first flow passage.

7. An edge-laminating apparatus comprising a first flow passage and an edge-laminating flow channel that converge, wherein said edge-laminating flow channel is disposed at the convergence, relative to said first flow passage, such that an edge-laminating stream laterally displaces by flow pressure an edge of a stream flowing through said first flow passage; wherein said edge-laminating flow channel comprises a transition channel for increasing lateral displacement of said stream edge; and wherein a wall of said transition channel for effecting the increasing lateral displacement, is locating downstream from said convergence, said wall being provided by an edge-lamination assembly.

8. The apparatus of claim 7, wherein said edge-lamination assembly is removably mounted.

9. The apparatus of clim 7, wherein the displacement-effecting wall is provided by a removably mounted, endpiece element of said edge-lamination assembly.

10. The apparatus of claim 7, further comprising valving means disposed upstream of a manifold of said edge-laminating flow channel.

11. The apparatus of claim 7, wherein said edge-laminating flow channel further comprises an inlet channel and a manifold upstream of and in fluid communication with said transition channel, said inlet channel and said manifold being defined by said edge-lamination assembly.

12. The apparatus of claim 7, werein said edge-laminating flow channel is oriented at said convergence, generally perpendicular to the flow-direction of said first flow passage.

13. A feedblock comprising the apparatus of claim 1.

14. The feedblock of claim 13, further comprising a removably mounted flow-selecting plug.

15. A feedblock comprising the apparatus of claim 7.

16. The feedblock of claim 15, further comprising a removably mounted flow-selecting plug.

17. A process for forming an edge-laminated stream, said process comprising transversely spreading an edge-laminating stream to a width equal to a thickness of a second stream; and driving by flow pressure, the transversely-spread stream into a second stream edge of said thickness, thereby laterally displacing the entire second stream edge and reducing the second stream width.

18. The process of claim 17, wherein lateral displacement is substantially complete as soon as the streams converge.

19. The process of claim 17, wherein lateral displacement is gradual.

20. The process of claim 17, wherein said second stream comprises a plurality of layers.

21. A process for forming an edge-laminated stream, said process comprising transversely spreading an edge-laminating stream to a width equal to a thickness of a second stream; and after a second stream edge of said thickness has been mechanically displaced and said second stream width has been thereby reduced, driving by flow pressure the transversely-spread stream into said second stream edge.

22. A process for forming an edge-laminated stream, said process comprising the following step sequence: dividing a flow stream into a first edge-laminating stream and a second edge-laminating stream; providing a selected flow volume for said first edge-laminating stream and said second edge-laminating stream; transversely spreading each edge-laminating stream; matching the flow velocity of each transversely-spread stream to that of a core stream, without changing the flow volume of either transversely-spread stream; and driving by flow pressure, each transversely-spread stream into an edge of said core stream, thereby laterally displacing edges of said core stream and reducing the core stream width.

23. The process of claim 22, wherein lateral displacement is substantially complete as soon as the streams converge.

24. The process of claim 22, wherein lateral displacement is gradual.

25. A process for forming an edge-laminated stream, said process comprising the following step sequence: dividing a flow stream into a first edge-laminating stream and a second edge-laminating stream; providing a selected flow volume for said first edge-laminating stream and said second edge-laminating stream; transversely spreading each edge-laminating stream; matching the flow velocity of each transversely-spread stream to that of a core stream, without changing the flow volume of either transversely-spread stream; and driving by flow pressure, each transversely-spread stream into an edge of said core stream after the core stream edges have been mechanically displaced and the core stream width has been thereby reduced.

26. The process of claim 25, wherein said core stream comprises a plurality of layers.

27. The process of claim 25, wherein each edge-laminating stream is spread to a width equal to the core stream thickness; and wherein core steam edges of said thickness are mechanically displaced.

28. A process for removing an edge of an extruded product, said process comprising (a) transversely spreading an edge-laminating stream to a width equal to a thickness of a second stream, and driving by flow pressure, the transversely-spread stream into a second stream edge of said thickness, thereby laterally displacing the entire second stream edge and reducing the second stream width; wherein said edge-laminating stream is sufficiently incompatible with said second stream that said edge-laminating stream may be peeled away from said second stream; (b) extruding a composite stream comprising said second stream and an edge formed by said edge-laminating stream; and (c) peeling said edge formed by said edge-laminating stream, away from said second stream.

29. A process for removing an edge of an extruded product, said process comprising (a) transversely spreading an edge-laminating stream to a width equal to a thickness of a second stream; and after a second stream edge of said thickness has been mechanically displaced and said second stream width has been thereby reduced, driving by flow pressure the transversely-spread stream into said second stream edge; wherein said edge-laminating stream is sufficiently incompatible with said second stream that said edge-laminating stream may be peeled away from said second stream; (b) extruding a composite stream comprising said second stream and an edge formed by said edge-laminating stream; and (c) peeling said edge formed by said edge-laminating stream, away from said second stream.

* * * * *